United States Patent
Watanabe et al.

(10) Patent No.: US 6,623,857 B2
(45) Date of Patent: Sep. 23, 2003

(54) NANOGRANULAR THIN FILM AND MAGNETIC RECORDING MEDIA

(75) Inventors: Masato Watanabe, Miyagi (JP); Tadayoshi Iwasa, Miyagi (JP); Tsuyoshi Masumoto, Miyagi (JP)

(73) Assignee: The Foundation: The Research Institute for Electric and Magnetic Materials, Sendai (JP)

( * ) Notice: Subject to any disclaimer, the term of this patent is extended or adjusted under 35 U.S.C. 154(b) by 170 days.

(21) Appl. No.: 09/818,654

(22) Filed: Mar. 28, 2001

(65) Prior Publication Data

US 2001/0036563 A1 Nov. 1, 2001

(30) Foreign Application Priority Data

Mar. 28, 2000  (JP) ........................................ 2000-132996

(51) Int. Cl.⁷ .............................. B32B 5/16; G11B 5/66
(52) U.S. Cl. .................. 428/402; 428/403; 428/694 T; 428/694 BA; 428/900
(58) Field of Search ...................... 428/694 T, 694 BA, 428/402, 403, 900

(56) References Cited

U.S. PATENT DOCUMENTS

| | | | | |
|---|---|---|---|---|
| 5,858,125 A | * | 1/1999 | Hasegawa | 148/304 |
| 5,895,727 A | * | 4/1999 | Hasegawa | 428/692 |
| 6,146,761 A | * | 11/2000 | Hirotsu et al. | 428/402 |
| 6,174,597 B1 | * | 1/2001 | Yusu et al. | 428/332 |
| 6,335,578 B1 | * | 1/2002 | Katsumi et al. | 310/68 B |
| 6,436,167 B1 | * | 8/2002 | Chow et al. | 75/371 |

OTHER PUBLICATIONS

The Japan Institute of Metals, vol. 35 (1996), No. 8, pp 840–842.

Appl. Phys. Lett. 52(6), Feb. 8, 1988, pp. 512–514.

English Abstract of Japanese Unexamined Patent Publication No. 9–320847, 12–97.

* cited by examiner

*Primary Examiner*—Leszek Kiliman
(74) *Attorney, Agent, or Firm*—Armstrong, Westerman & Hattori, LLP

(57) ABSTRACT

A nanogranular thin film consisting of nonmagnetic matrix and ferromagnetic fine particles in nano scale is improved to enhance the thermal stability and the S/N ratio. The ferromagnetic fine particles consist of $(Fe_aCo_{1-a})_{1-x}Pt_x$, $(0.3 \leq x \leq 0.7, 0.1 \leq a \leq 1)$, $(Fe_aCo_{1-a})_{1-x}Pd_x$, $(0.3 \leq x \leq 0.7, 0.1 \leq a \leq 1)$ or $(Fe_aCo_{1-a})_{1-x}(Pt_bPd_{1-b})_x$, $(0.3 \leq x \leq 0.7, 0.1 \leq a \leq 1,$ and $0 < b < 1)$.

6 Claims, 4 Drawing Sheets

NANOGRANULAR THIN FILM AND MAGNETIC RECORDING MEDIA

BACKGROUND OF INVENTION

1. Field of Invention

The present invention relates to a nanogranular thin film comprising a nonmagnetic matrix and a precious-metal based ordered alloy in nanoscale order, which is dispersed in the matrix and which has extremely great magnetocrystalline anisotropy. The present invention also relates to a magnetic recording media comprising the nanogranular thin film, and which is appropriate for such ultra-high recording density as is required in the future.

2. Description of Related Art

A longitudinal magnetic recording media is used at present for the hard disc and the like, its recording density attained commercially at present is approximately 10 Gbit/inch$^2$ (Gbpi). Since the recording density of a magnetic recording media is increasing annually by 60% or more, the speed of increase, year by year, is rapid. As is known, when the recording density is increased while using the conventional materials, the constituent crystal grains of one recording bit correspondingly decrease. As a result, the S/N (signal/noise) ratio considerably decreases at the time of recording. In order to cope with the increasing recording density of a recording media, its crystal structure must be refined.

A Co—Cr based alloy film is used at present for either longitudinal or perpendicular recording media. Improvements of the Co—Cr based alloy have been implemented year by year to enhance the recording density. Consequently, the crystal-grain size of commercially available recording media having 6 Gbpi of recording density has been refined to approximately 13 nm. A Co—Cr based alloy film having as small as 10 nm or less of crystal grain size has been tested to provide recording media having 35 Gbpi or more of recording density. Theoretically, the recording performance of Co—Cr based alloy is based on the magnetocrystalline anisotropy of hcp-Co. Since the critical diameter of superparamagnetism is approximately 7 nm in this alloy, it has been pointed out that this alloy incurs a problem involving thermal stability. The index of thermal stability is expressed in terms of thermal stability factor $K_u \cdot V/kT$. Provided that the unit volume of magnetic material V and the temperature T are the same, the thermal stability is higher as the uniaxial anisotropy constant $K_u$ of material becomes higher.

Researches of nanogranular media have been implemented (c.f., Materia published by The Japan Institute of Metals, Vol. 35, No. 8, pages 840–842. "Specific Magnetic Properties of Metallic Microclusters and Their Possible Application to 3D-ultra-high-density Magnetic Recording" by Kawazoe). In the nanogranular material, the granules can be distinctly separated from one another, and low-noise media can be easily obtained. The nanogranular structure consists of a matrix of oxide and the like and granules in nano-scale dispersed in the matrix. In the early stages of nanogranular media, the Fe or Fe—Co based nanogranular structure was studied. It is confirmed that, although the coercive force obtained is approximately 160 kA/m and is hence not very high as expected, the noise of media is extremely low.

CoPt having $10^6$ J/m$^3$ of magnetocrystalline anisotropy was used as a base of the nanogranular media one a study. The magnetocrystalline anisotropy constant of the hcp Co—Cr, which is the base material of the Co—Cr thin film magnetic media used at present, is in the order of $10^5$ J/m$^3$. As is described hereinabove, if the crystal grains of Co—Cr are refined to 10 nm or less so as to substantially increase the recording density over the present level, the thermal stability of the media may be impaired. Since the Co—Cr based media is an alloy thin film consisting of Co—Cr crystal grains, principally their interactions are not interrupted at all. It is, therefore, difficult to drastically lessen the noise when the recording density is enhanced.

SUMMARY OF INVENTION

It is, therefore, an object of the present invention to provide a nanogranular thin film which has improved thermal stability and is capable of noise reduction.

It is also an object of the present invention to provide a magnetic recording media, which is appropriate for the ultra-high recording to be applied in the future.

In accordance with the object of the present invention, there is provided a nanogranular thin film having 160 kA/m of coercive force and consisting of from 40 to 70 atomic % of a nonmagnetic matrix and from 60 to 30 atomic % of ferromagnetic fine particles having 20 nm or less of average particle size, being distributed in the nonmagnetic matrix, and being expressed by a general formula $(Fe_aCo_{1-a})_{1-x}Pt_x$, with the atomic composition ratio of $0.3 \leq x \leq 0.7$, $0.1 \leq a \leq 1$.

There is also provided a nanogranular thin film having 160 kA/m of coercive force and consisting of from 40 to 70 atomic % of a nonmagnetic matrix and from 60 to 30 atomic % of ferromagnetic fine particles having 20 nm or less of average particle size, being distributed in the nonmagnetic matrix, and being expressed by a general formula $(Fe_aCo_{1-a})_{1-x}Pd_x$, with the atomic composition ratio of $0.3 \leq x \leq 0.7$, $0.1 \leq a \leq 1$.

There is further provided a nanogranular thin film having 160 kA/m of coercive force and consisting of from 40 to 70 atomic % of a nonmagnetic matrix and from 60 to 30 atomic % of ferromagnetic particles having 20 nm or less of average particle size, being distributed in the nonmagnetic matrix, and being expressed by a general formula $(Fe_aCo_{1-a})_{1-x}(Pt_bPd_{1-b})_x$, with the atomic composition ratio of $0.3 \leq x \leq 0.7$, $0.1 \leq a \leq 1$, and $0 < b < 1$.

The nonmagnetic matrix of the present invention may consist of oxide, fluoride, non-metallic metal or the like. The magnetic granules of nano-scale order are dispersed in the nonmagnetic matrix to provide a refined structure. The nonmagnetic matrix and the magnetic granules form the granular structure. The first requirement for attaining ultra-high recording density and low noise of the magnetic recording is satisfied by the fine granular structure. The construction of nanogranular thin film is denoted herein by the granule material (Fe) and the matrix material (SiO$_2$) linked by a hyphen as follows: Fe—SiO$_2$. Such a structure can be easily formed by means of subjecting the materials of a nonmagnetic matrix and granular nonmagnetic material to physical vapor deposition (PVD) such as vacuum deposition, various sputtering or laser ablasion. In addition, such chemical methods as decomposition of organic material, the Langmuir Blodgett (LB) method or application of a chemical solution can provide the fine nanogranular structure. These methods are advantageous for forming the self-organized nanogranular structure and decreasing the signal/noise (S/N) ratio. The self organization means that the arrangement of fine particles exhibits energetically stable regularity. The two dimensionally regularly arranged ferromagnetic fine particles attain high S/N ratio of the recording media. The self organization means that the arrangement of particles exhibits energitically stable regularity. The two dimensionally regularly arranged ferromagnetic fine particles attain high S/N ration of the recording media.

When the nonmagnetic matrix is less than 40 atomic % and hence the packing density of the ferromagnetic particles is high, the coercive force after heat treatment becomes high. However, the ferromagnetic particles coalesce with one another in the nonmagnetic matrix so that the S/N ratio of the magnetic recording media is lowered. On the other hand, when the proportion of the nonmagnetic matrix becomes high, it is possible to prevent the ferromagnetic fine particles from coalescence during the heat treatment. However, the coercive force and saturation magnetization are lowered. The nonmagnetic matrix is, therefore, preferably 70 atomic % or less.

The nanogranular thin film according to the present invention is usually of from 0.001 to 1 $\mu$m thickness and may be deposited on any known substrate materials such as polymer, glass, metal, single crystal, ceramics and the like.

As is described hereinabove, the refinement of structure incurs a problem in thermal stability as long as the conventional Co—Cr is used. Each of the ordered alloys, which is the base of the present invention, has $10^6$ J/m$^3$ or more of uniaxial magnetocrystalline anisotropy constant $K_u$ and hence excellent thermal stability. Particularly, the FePt ordered alloy has $7\times10^6$ J/m$^3$ or more of uniaxial magneto crystalline constant $K_u$ and 1.45 T of saturation magnetization 4 $\pi$Ms. The critical diameter of superparamagnetism of FePt at room temperature is approximately 3 nm. The FePt granules can, therefore, be refined to 5 nm or less. The CoPt ordered alloy has $4\times10^6$ J/m$^3$ or more of uniaxial magnetocrystalline constant $K_u$ and 1.45T of saturation magnetization 4 $\pi$Ms. Not only the anisotropy but also the saturation magnetization of FePt are superior to those of CoPt. FePt is, therefore, superior to CoPt as the magnetic material of recording media.

When the anisotropy axes of nanogranular particles are aligned, the squareness of the hysteresis would be improved. It is, therefore, preferable to align the anisotropy axes in the structure of a recording media. As is known, when the FePd ordered alloy undergoes transformation from the disordered phase to the ordered phase under the application of magnetic field, a variant of the disordered phase, which is closely directed to the direction of the magnetic-field application, becomes the C axis of the ordered phase. In the case of FePd, the anisotropy axes can, therefore, be controlled by means of application of magnetic field.

As is described hereinabove, the ordered alloy having the magnetic anisotropy constant of the order of $10^6$ J/m$^3$ is utilized in the nanogranular thin film according to the present invention. A thin film can be easily formed by such physical vapor-deposition methods as sputtering and vacuum-deposition. In the thin film as deposited, since the dispersed particles consist of the disordered alloy, heat treatment for ordering is necessary. As a result of the heat treatment, coercive force amounting to 800 kA/m or more can be obtained.

Temperature for the ordering heat treatment is dependent upon the kind of materials of the nonmagnetic matrix. When this material is oxide, nitride or fluoride, the growth of granules due to heat treatment can be suppressed, as compared with the cases of the nonmagnetic metal. However, the heat-treating temperature tends to be higher in the cases of the former materials than in the case of the non-metallic material. When the nonmagnetic matrix consists of metal, the heat-treating temperature tends to be lower than in the cases of oxide, nitride and fluoride. No matter which material is the constituent of the nonmagnetic matrix, if the heat-treating temperature is the same, a higher coercive force is obtained with the increase in the packing density of the nanogranular material. The present invention is hereinafter described in detail with reference to the drawings and examples.

EXAMPLES

Example 1

A $(Fe_aCo_{1-a})_{1-x}$-Pt$_x$-Based Nanogranular Thin Film

The Fe(Fe$_a$Pt$_{1-a}$)$_{1-x}$-Pt$_x$-based nanogranular thin film was deposited on a glass substrate and Si wafer by means of a dual target ion-beam sputtering machine. The final base pressure was $4\times10^{-5}$ Pa or less, and the ion-beam accelerating voltage was 500V. The target used to be sputtered for forming the magnetic material is a composite target consisting of an Fe target and Co and Pt chips symmetrically arranged on the Fe target. The Al, Ag or MgF$_2$ targets were used to be sputtered for forming the Al, Ag or MgF$_2$ matrix, respectively. In the case of Al$_2$O$_3$ and AlN matrix, oxygen or nitrogen was supplied in the vicinity of the substrates during the deposition.

Figure 1:
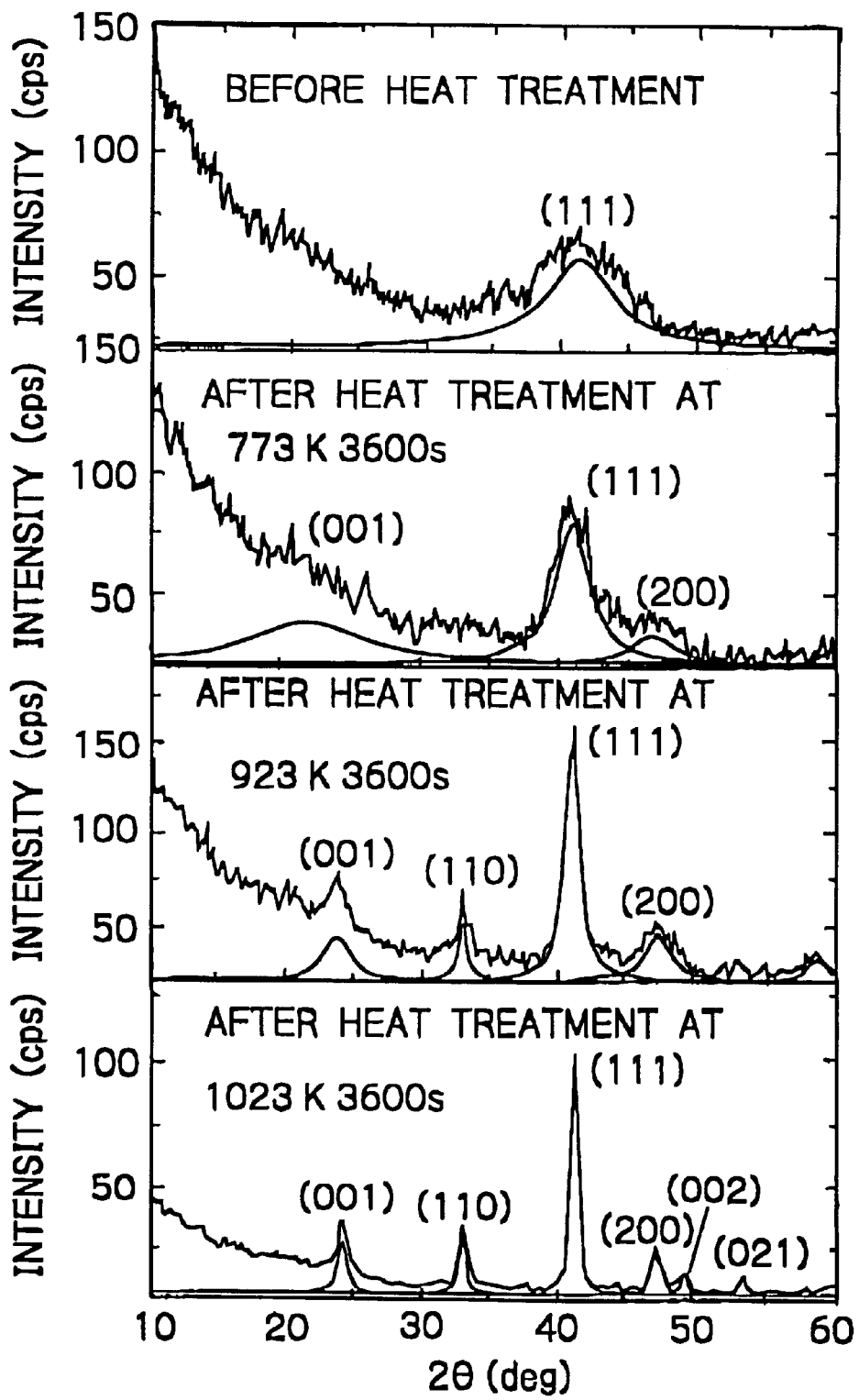
FIG. 1 shows X-ray diffraction patterns of a $(Fe_{0.55}Pt_{0.45})_{0.47}$—$(Al_{0.4}O_{0.6})_{0.53}$ granular thin film.

Referring to FIG. 1, the X-ray diffraction pattern of $(Fe_{0.55}Pt_{0.45})_{0.47}$—$(Al_{0.4}O_{0.6})_{0.53}$ granular thin film is shown. Since almost no ordering of the FePt phase occurs at a heat treating temperature up to 773K, FePt acts superparamagnetically. When the heat-treating temperature becomes 923K or higher, diffraction peaks corresponding to the ordered PtFe phase are observed. The so heat-treated granular film exhibits a ferromagnetic hysteresis. Since no diffraction-peaks corresponding to $Al_2O_3$ are observed, it is believed that $Al_2O_3$ is amorphous.

Figure 2:
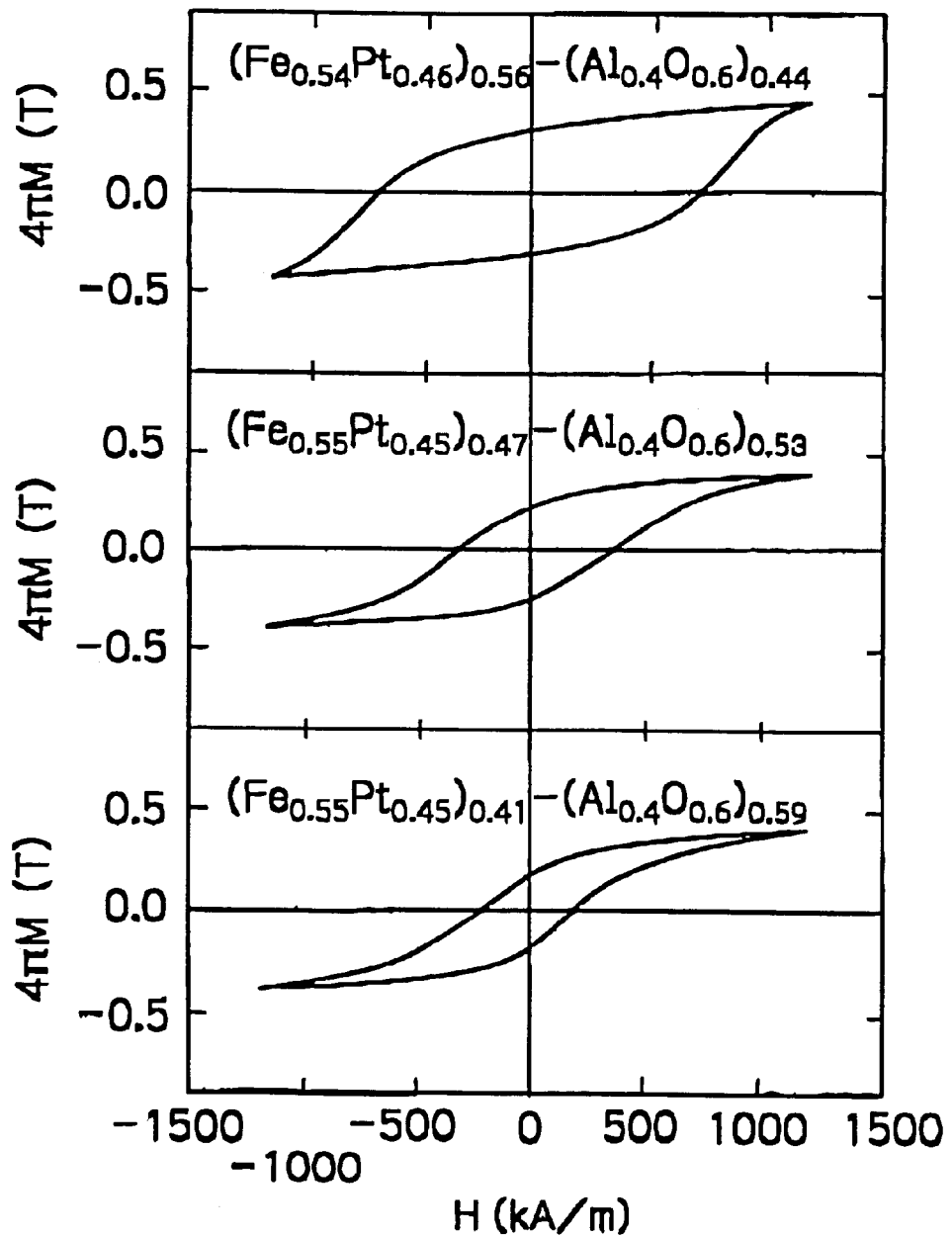
FIG. 2 shows hysteresis loops of the (Fe—Pt)—Al$_2$O$_3$ granular thin films having different matrix compositions, which are heat treated at 923K for 1 hour.

Referring to FIG. 2, the hysteresis loops of (Fe—Pt)—$Al_2O_3$ granular thin film is shown. This film is heat-treated at 923K for 1 hour. The matrix of this film is different from that of FIG. 1. As is clear from FIG. 2, higher coercive force is obtained with a lower proportion of the Al oxide matrix and, hence, a higher proportion of the packing density of the FePt granules. Similar tendency can be confirmed in the case of a matrix consisting of other materials than the aluminum oxide.

Figure 3:
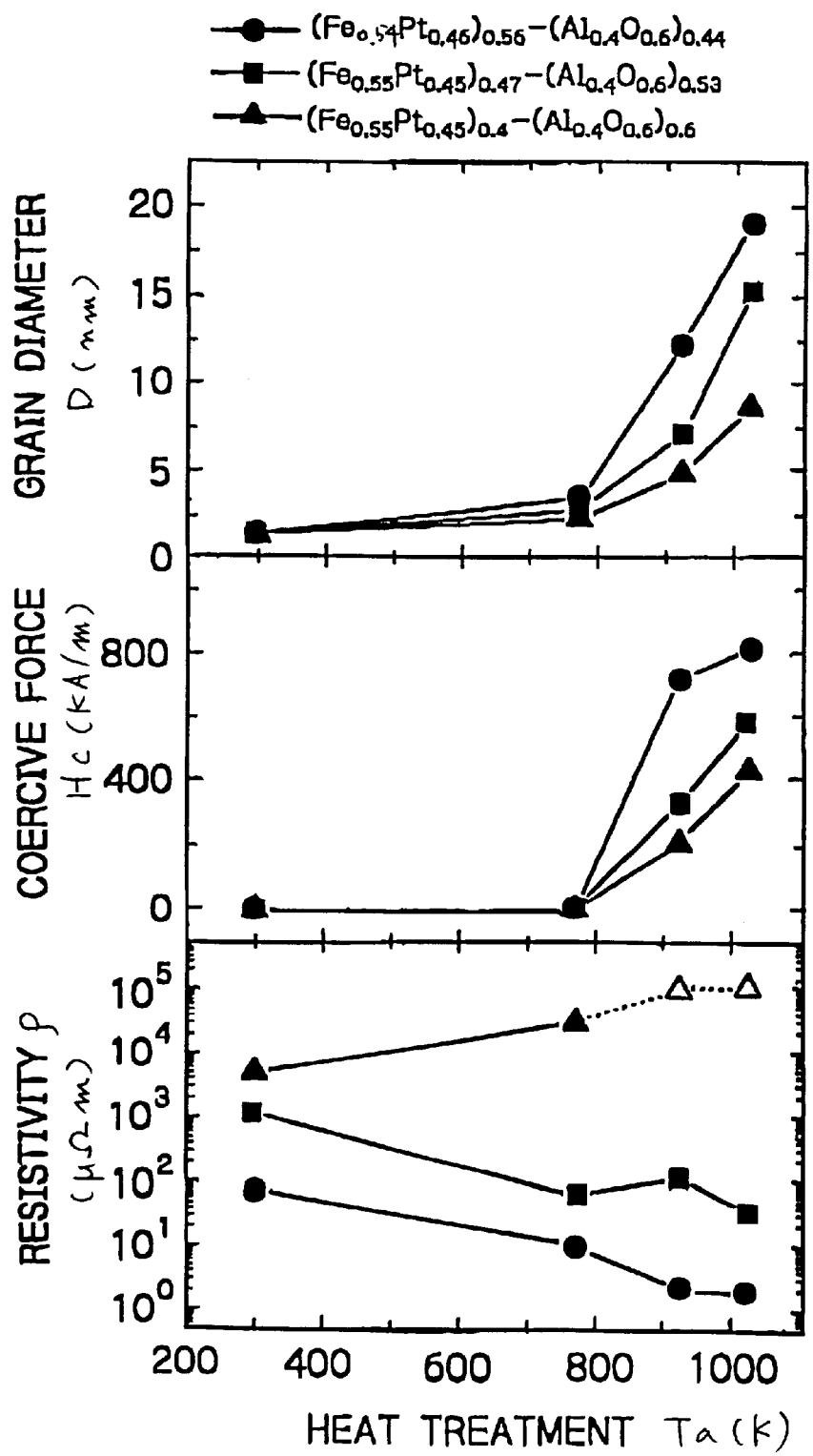
FIG. 3 shows heat-treating temperature dependence of granule-diameter D, coercive force Hc and resisitivity of the (Fe—Pt)—Al$_2$O$_3$ granular thin films having different matrix compositions.

Referring to FIG. 3, dependence of granule-diameter D, coercive force He and resistivity of the (Fe—Pt)—$Al_2O_3$ granular thin films upon the heat-treating temperature Ta is shown. Since the ordering of FePt begins at a temperature of 923K or higher, the coercive force abruptly begins to increase at 923K or higher. The highest coercive force is 800 KA/m or more. The coercive force is higher as the proportion of the Al-oxide matrix is lower. The grain size D increases abruptly at a heat-treatment temperature of 923K or higher. However, the increase in the grain size can be suppressed to 10 nm or less, when the proportion of the matrix is higher. The resistivity ρ indicates the structural bonding state between the granules and increases to a non-measurable level, when the proportion of the matrix is greatest. This indicates that the granules are distinctly separated from one another.

Figure 4:
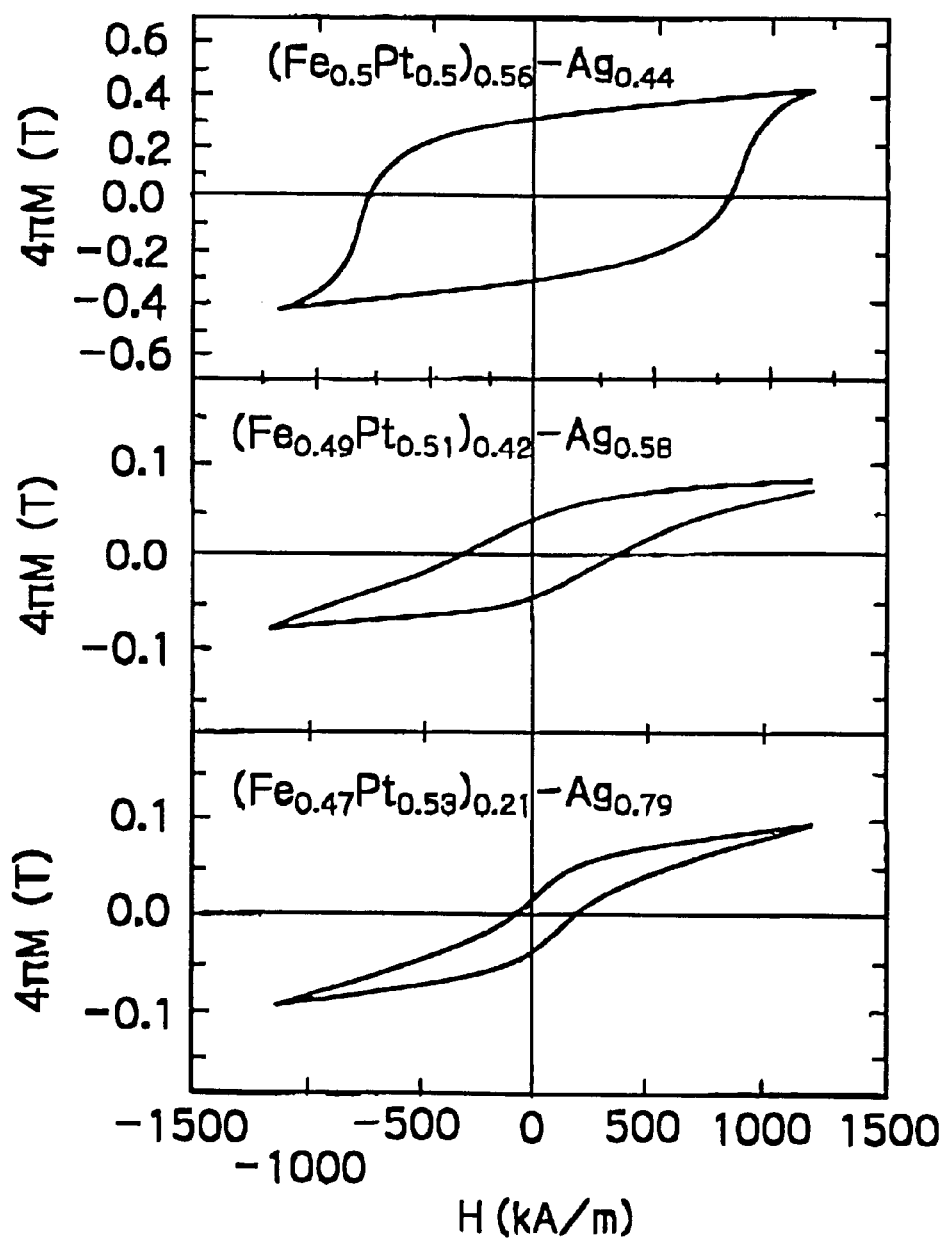
FIG. 4 shows hysteresis loops of the (Fe—Pt)—Ag granular thin films having different matrix compositions, which are heat treated at 923K for 1 hour.

Referring to FIG. 4, the hysteresis loops of (Fe—Pt)—Ag granular thin film is shown. This film is heat-treated at 923K for 1 hour. The matrix of this film is different from that of FIGS. 1 and 2. As is clear from FIG. 4, high coercive force can be attained at a relatively low heat-treating temperature.

Example 2

The ((FeCo)Pt)—(AlO), ((FeCo)Pt)—(AlN), and ((FeCo)Pt)—(MgF) nanogranular films were prepared by the method of Example 1. The heat-treating temperature, coercive force, remanence and diameter of granules D are shown in Table 1.

TABLE 1

| Composition | Heat-Treating Time and Temperature | Coercive Force Hc | Residual Magnetization 4 πMr | Diameter of Granules D |
|---|---|---|---|---|
| $((Fe_{0.8}Co_{0.2})_{0.57}Pt_{0.43})_{0.55}$-$(Al_{0.4}O_{0.6})_{0.45}$ | 923 K · 3.6 Ks | 650 kA/m | 0.21 T | 14 nm |
| $((Fe_{0.8}Co_{0.2})_{0.56}Pt_{0.44})_{0.46}$-$(Al_{0.4}O_{0.6})_{0.54}$ | 923 K · 3.6 Ks | 380 kA/m | 0.19 T | 8 m |
| $((Fe_{0.8}Co_{0.2})_{0.57}Pt_{0.43})_{0.39}$-$(Al_{0.4}O_{0.6})_{0.61}$ | 923 K · 3.6 Ks | 200 kA/m | 0.18 T | 4 nm |
| $((Fe_{0.4}Co_{0.6})_{0.54}Pt_{0.46})_{0.48}$-$(Al_{0.4}O_{0.6})_{0.52}$ | 923 K · 3.6 Ks | 310 kA/m | 0.13 T | 7 nm |
| $((Fe_{0.3}Co_{0.7})_{0.53}Pt_{0.47})_{0.48}$-$(Al_{0.4}O_{0.6})_{0.52}$ | 923 K · 3.6 Ks | 280 kA/m | 0.12 T | 8 nm |
| $((Fe_{0.9}Co_{0.1})_{0.52}Pt_{0.48})_{0.56}$-$(Al_{0.5}N_{0.5})_{0.44}$ | 923 K · 3.6 Ks | 680 kA/m | 0.21 T | 15 nm |
| $((Fe_{0.9}Co_{0.1})_{0.52}Pt_{0.48})_{0.43}$-$(Al_{0.5}N_{0.5})_{0.57}$ | 923 K · 3.6 Ks | 410 kA/m | 0.18 T | 9 nm |
| $((Fe_{0.6}Co_{0.4})_{0.52}Pt_{0.48})_{0.58}$-$(Al_{0.5}N_{0.5})_{0.42}$ | 923 K · 3.6 Ks | 780 kA/m | 0.22 T | 18 nm |
| $((Fe_{0.6}Co_{0.4})_{0.52}Pt_{0.48})_{0.41}$-$(Al_{0.5}N_{0.5})_{0.59}$ | 923 K · 3.6 Ks | 450 kA/m | 0.16 T | 5 nm |
| $((Fe_{0.8}Co_{0.2})_{0.53}Pt_{0.48})_{0.54}$-$(Mg_{0.34}F_{0.66})_{0.46}$ | 923 K · 3.6 Ks | 600 kA/m | 0.17 T | 11 nm |
| $((Fe_{0.8}Co_{0.2})_{0.53}Pt_{0.48})_{0.45}$-$(Mg_{0.34}F_{0.66})_{0.55}$ | 923 K · 3.6 Ks | 390 kA/m | 0.14 T | 7 nm |

Example 3

$(Fe_aCo_{1-a})_{1-x}$-$(Fe_bPd_{1-b})_x$-Based Nanogranular Thin Film

The $(Fe_aCo_{1-a})_{1-x}$-$(Fe_bPd_{1-b})_x$ based nanogranular thin film was deposited on a glass substrate and Si wafer by means of a dual target ion-beam sputtering machine. The same method and conditions as in Example 1 were used in Example 3. The heat-treating temperature, coercive force, remanence and diameter of granules D are shown in Table 2.

TABLE 2

| Composition | Heat-Treating Time and Temperature | Coercive Force Hc | Residual Magnetization 4 πMr | Diameter of Granules D |
|---|---|---|---|---|
| $((Fe_{0.8}Co_{0.2})_{0.57}Pd_{0.43})_{0.55}$-$(Al_{0.4}O_{0.6})_{0.45}$ | 923 K · 3.6 Ks | 180 kA/m | 0.21 T | 12 nm |
| $((Fe_{0.8}Co_{0.2})_{0.56}Pd_{0.44})_{0.46}$-$(Al_{0.4}O_{0.6})_{0.54}$ | 923 K · 3.6 Ks | 155 kA/m | 0.19 T | 10 nm |
| $((Fe_{0.8}Co_{0.2})_{0.57}Pd_{0.43})_{0.39}$-$(Al_{0.4}O_{0.6})_{0.61}$ | 923 K · 3.6 Ks | 121 kA/m | 0.18 T | 7 nm |
| $((Fe_{0.9}Co_{0.1})_{0.54}(Pt_{0.9}Pd_{0.1})_{0.46})_{0.48}$-$(Al_{0.4}O_{0.6})_{0.52}$ | 923 K · 3.6 Ks | 720 kA/m | 0.21 T | 13 nm |
| $((Fe_{0.9}Co_{0.1})_{0.53}(Pt_{0.5}Pd_{0.5})_{0.47})_{0.48}$-$(Al_{0.4}O_{0.6})_{0.52}$ | 923 K · 3.6 Ks | 280 kA/m | 0.18 T | 12 nm |
| $(Fe_{0.52}(Pt_{0.9}Pd_{0.1})_{0.48})_{0.56}$-$(Al_{0.5}N_{0.5})_{0.44}$ | 923 K · 3.6 Ks | 660 kA/m | 0.22 T | 21 nm |
| $(Fe_{0.52}(Pt_{0.6}Pd_{0.4})_{0.45})_{0.55}$-$(Al_{0.5}N_{0.5})_{0.45}$ | 923 K · 3.6 Ks | 210 kA/m | 0.21 T | 18 nm |
| $(Fe_{0.52}(Pt_{0.3}Pd_{0.7})_{0.48})_{0.56}$-$(Al_{0.5}N_{0.5})_{0.44}$ | 923 K · 3.6 Ks | 110 kA/m | 0.18 T | 19 nm |
| $(Fe_{0.53}(Pt_{0.9}Pd_{0.1})_{0.48})_{0.54}$-$(Mg_{0.34}F_{0.66})_{0.46}$ | 923 K · 3.6 Ks | 482 kA/m | 0.17 T | 20 nm |
| $(Fe_{0.53}(Pt_{0.7}Pd_{0.3})_{0.48})_{0.54}$-$(Mg_{0.34}F_{0.66})_{0.46}$ | 923 K · 3.6 Ks | 245 kA/m | 0.14 T | 19 nm |

What is claimed is:

1. A nanogranular thin film having 160 kA/m of coercive force and consisting of from 40 to 70 atomic % of a nonmagnetic matrix and from 60 to 30 atomic % of ferromagnetic fine particles having 20 nm or less of average particle size, being distributed in the nonmagnetic matrix, and being expressed by a general formula $(Fe_aCo_{1-a})_{1-x}Pt_x$, with the atomic composition ratio of $0.3 \leq x \leq 0.7$, $0.1 \leq a \leq 1$.

2. A nanogranular thin film having 160 kA/m of coercive force and consisting of from 40 to 70 atomic % of a nonmagnetic matrix and from 60 to 30 atomic % of ferromagnetic fine particles having 20 nm or less of average particle size, being distributed in the nonmagnetic matrix, and being expressed by a general formula $(Fe_aCo_{1-a})_{1-x}Pd_x$, with the atomic composition ratio of $0.3 \leq x \leq 0.7$, $0.1 \leq a \leq 1$.

3. A nanogranular thin film having 160 kA/m of coercive force and consisting of from 40 to 60 atomic % of a nonmagnetic matrix and from 60 to 30 atomic % of ferromagnetic fine particles having 20 nm or less of average particle size, being distributed in the nonmagnetic matrix, and being expressed by a general formula $(Fe_aCo_{1-a})_{1-x}(Pt_bPd_{1-b})_x$, with the atomic composition ratio of $0.3 \leq x \leq 0.7$, $0.1 \leq a \leq 1$, and $0 < b < 1$.

4. A magnetic recording media comprising a nanogranular thin film having 160 kA/m of coercive force and consisting of from 40 to 70 atomic % of a nonmagnetic matrix and from 60 to 30 atomic % of ferromagnetic fine particles having 20 nm or less of average particle size, being distributed in the nonmagnetic matrix, and being expressed by a general formula $(Fe_aCo_{1-a})_{1-x}Pt_x$, with the atomic composition ratio of $0.3 \leq x \leq 0.7$, $0.1 \leq a \leq 1$.

5. A magnetic recording media comprising a nanogranular thin film having 160 kA/m of coercive force and consisting of from 40 to 70 atomic % of a nonmagnetic matrix and from 60 to 30 atomic % of ferromagnetic particles having 20 nm or less of average particle size, being distributed in the nonmagnetic matrix, and being expressed by a general formula $(Fe_aCo_{1-a})_{1-x}Pd_x$, with the atomic composition ratio of $0.3 \leq x \leq 0.7$, $0.1 \leq a \leq 1$.

6. A magnetic recording media consisting of a nanogranular thin film having 160 kA/m of coercive force and consisting of from 40 to 70 atomic % of a nonmagnetic matrix and from 60 to 30 atomic % of ferromagnetic particles having 20 nm or less of average particle size, being distributed in the nonmagnetic matrix, and being expressed by a general formula $(Fe_aCo_{1-a})_{1-x}(Pt_bPd_{1-b})_x$, with the atomic composition ratio of $0.3 \leq x \leq 0.7$, $0.1 \leq a \leq 1$, and $0 < b < 1$.

* * * * *